(12) United States Patent
Bustamente

(10) Patent No.: US 9,185,184 B2
(45) Date of Patent: Nov. 10, 2015

(54) SYSTEM AND METHOD FOR PROVIDING CALENDAR AND SPEED DATING FEATURES FOR MATCHING USERS IN A NETWORK ENVIRONMENT

(71) Applicant: MATCH.COM, L.L.C., Dallas, TX (US)

(72) Inventor: Michael G. Bustamente, Frisco, TX (US)

(73) Assignee: MATCH.COM, L.L.C., Dallas, TX (US)

( * ) Notice: Subject to any disclaimer, the term of this patent is extended or adjusted under 35 U.S.C. 154(b) by 237 days.

(21) Appl. No.: 13/869,948

(22) Filed: Apr. 24, 2013

(65) Prior Publication Data

US 2013/0238708 A1    Sep. 12, 2013

Related U.S. Application Data

(63) Continuation-in-part of application No. 12/415,839, filed on Mar. 31, 2009, and a continuation-in-part of application No. 12/436,912, filed on May 7, 2009, now Pat. No. 8,621,090, and a continuation-in-part of application No. 12/436,869, filed on May 7, 2009, now Pat. No. 8,885,012.

(51) Int. Cl.
*G06F 15/16* (2006.01)
*H04L 29/08* (2006.01)
(Continued)

(52) U.S. Cl.
CPC .......... *H04L 67/306* (2013.01); *G06Q 10/1095* (2013.01); *H04L 61/2596* (2013.01); *H04L 61/307* (2013.01); *H04L 61/3085* (2013.01);
*H04L 63/0421* (2013.01); *H04L 67/28* (2013.01); *H04W 4/206* (2013.01); *H04L 65/1069* (2013.01)

(58) Field of Classification Search
CPC .................................................. H04L 29/8072
USPC .................................................. 709/203, 204
See application file for complete search history.

(56) References Cited

U.S. PATENT DOCUMENTS 6,175,619 B1    1/2001  DeSimone
6,408,001 B1    6/2002  Chuah et al.
(Continued)

OTHER PUBLICATIONS

Final Office Action in U.S. Appl. No. 12/415,839 mailed on Jun. 6, 2014.
(Continued)

*Primary Examiner* — Adnan Mirza
(74) *Attorney, Agent, or Firm* — Patent Capital Group

(57) ABSTRACT

A method is provided in one example embodiment and includes receiving a request at a communication broker for a communication session to involve a first endpoint and a second endpoint, where the communication broker includes a processor and a memory element. The method may also include evaluating first calendar information for a first end user associated with the first endpoint and second calendar information for a second end user associated with the second endpoint. The method may also include reconciling the first calendar information with the second calendar information to provide a time slot for the communication session. Additionally, the method may include mapping first end user data to a first identity associated with the first end user, where the second endpoint is shown the first identity, and where the first end user data associated with the first endpoint is hidden from being shown to the second endpoint.

16 Claims, 9 Drawing Sheets

(51) Int. Cl.
*H04L 29/12* (2006.01)
*H04L 29/06* (2006.01)
*G06Q 10/10* (2012.01)
*H04W 4/20* (2009.01)

(56) References Cited

U.S. PATENT DOCUMENTS

| | | |
|---|---|---|
| 6,564,261 B1 | 5/2003 | Gudjonsson et al. |
| 6,680,943 B1 | 1/2004 | Gibson et al. |
| 6,865,161 B1 | 3/2005 | Sponaugle et al. |
| 7,139,811 B2 | 11/2006 | Lev Ran et al. |
| 7,151,749 B2 | 12/2006 | Vega-Garcia et al. |
| 7,171,482 B2 | 1/2007 | Jones et al. |
| 7,203,674 B2 | 4/2007 | Cohen |
| 7,394,811 B2 | 7/2008 | Gibson et al. |
| 7,440,562 B2 | 10/2008 | Barnes et al. |
| 7,478,161 B2 | 1/2009 | Bernet et al. |
| 7,486,696 B2 | 2/2009 | Garg et al. |
| 7,499,720 B2 | 3/2009 | Idnani |
| 7,539,127 B1 | 5/2009 | Shaffer et al. |
| 7,630,486 B2 | 12/2009 | Lee et al. |
| 7,640,293 B2 | 12/2009 | Wilson et al. |
| 7,649,881 B2 | 1/2010 | Casey |
| 7,792,065 B2 | 9/2010 | Jepson et al. |
| 8,051,130 B2 | 11/2011 | Logan et al. |
| 8,054,960 B1 | 11/2011 | Gunasekara |
| 8,281,027 B2 | 10/2012 | Martinez et al. |
| 8,316,134 B2 | 11/2012 | Tanimoto |
| 8,621,090 B2 | 12/2013 | Bustamente |
| 8,885,012 B2 | 11/2014 | Bustamente |
| 8,996,618 B2 | 3/2015 | Bustamente |
| 2002/0041590 A1 | 4/2002 | Donovan |
| 2003/0224792 A1 | 12/2003 | Verma et al. |
| 2003/0235209 A1 | 12/2003 | Garg et al. |
| 2004/0030747 A1 | 2/2004 | Oppermann |
| 2005/0246419 A1 | 11/2005 | Jaatinen |
| 2005/0276268 A1 | 12/2005 | Poikselka et al. |
| 2006/0045243 A1 | 3/2006 | Durga et al. |
| 2006/0146997 A1 | 7/2006 | Qian et al. |
| 2006/0235994 A1 | 10/2006 | Wu |
| 2006/0281407 A1 | 12/2006 | Deeds |
| 2007/0019545 A1 | 1/2007 | Alt et al. |
| 2007/0064895 A1 | 3/2007 | Wong et al. |
| 2007/0071223 A1 | 3/2007 | Lee et al. |
| 2007/0201480 A1 | 8/2007 | Bao et al. |
| 2007/0282621 A1 | 12/2007 | Altman et al. |
| 2008/0070697 A1 | 3/2008 | Robinson et al. |
| 2008/0104227 A1 | 5/2008 | Birnie et al. |
| 2008/0144615 A1 | 6/2008 | Casey |
| 2008/0255989 A1 | 10/2008 | Altberg et al. |
| 2009/0024741 A1 | 1/2009 | Roach |
| 2009/0322597 A1 | 12/2009 | Medina Herrero et al. |
| 2010/0071053 A1 | 3/2010 | Ansari et al. |
| 2010/0077017 A1 | 3/2010 | Martinez et al. |
| 2010/0083364 A1 | 4/2010 | Fernandez Gutierrez |
| 2010/0088246 A1 | 4/2010 | Lim |
| 2010/0099389 A1 | 4/2010 | Zhu et al. |
| 2010/0106842 A1 | 4/2010 | Cosmadopoulos et al. |
| 2010/0195488 A1 | 8/2010 | Mehrotra et al. |
| 2010/0217837 A1 | 8/2010 | Ansari et al. |
| 2010/0217876 A1 | 8/2010 | Fikouras et al. |
| 2010/0241755 A1 | 9/2010 | Bassett et al. |
| 2010/0246576 A1 | 9/2010 | Bustamente |
| 2010/0260174 A1 | 10/2010 | Preiss et al. |
| 2010/0283827 A1 | 11/2010 | Bustamente |
| 2010/0285856 A1 | 11/2010 | Thomas |
| 2010/0287286 A1 | 11/2010 | Bustamente |
| 2011/0182205 A1 | 7/2011 | Gerdes et al. |
| 2011/0289574 A1 | 11/2011 | Hull et al. |
| 2011/0313647 A1 | 12/2011 | Koebler |
| 2013/0003718 A9 | 1/2013 | daCosta et al. |
| 2013/0212494 A1 | 8/2013 | Heiferman et al. |
| 2013/0232213 A1 | 9/2013 | Bustamente |
| 2014/0082087 A1 | 3/2014 | Bustamente |

OTHER PUBLICATIONS

Request for Continued Examination in U.S. Appl. No. 12/436,869, filed Jun. 16, 2014.
Notice of Allowance in U.S. Appl. No. 12/436,869 mailed on Jul. 9, 2014.
Request for Continued Examination and Amendment in U.S. Appl. No. 12/415,839, filed Sep. 8, 2014.
Non-Final Office Action in U.S. Appl. No. 12/415,839 mailed on Dec. 18, 2014.
Non-Final Office Action in U.S. Appl. No. 14/088,387 mailed on Sep. 22, 2014.
Response to Non-Final Office Action dated Sep. 22, 2014 in U.S. Appl. No. 14/088,387, filed Nov. 20, 2014.
Notice of Allowance in U.S. Appl. No. 14/088,387 mailed on Dec. 18, 2014.
Response to Non-Final Office Action in U.S. Appl. No. 12/415,839, filed Mar. 18, 2015.
Non-Final Office Action in U.S. Appl. No. 13/869,912 mailed on Feb. 27, 2015.
Final Office Action in U.S. Appl. No. 12/415,839 mailed in Apr. 25, 2013.
Request for Continued Examination and Amendment in U.S. Appl. No. 12/415,839, filed Jul. 25, 2013.
Non-Final OA in U.S. Appl. No. 12/415,839 mailed on Aug. 16, 2013.
Response to Non-Final Office Action dated Aug. 16, 2013 in U.S. Appl. No. 12/415,839, filed Nov. 16, 2013.
Response to Non-Final Office Action dated Feb. 7, 2012 in U.S. Appl. No. 12/436,869, filed Apr. 25, 2012.
Request for Continued Examination and Amendment in U.S. Appl. No. 12/436,869, filed Jul. 25, 2012.
Notice of Allowance in U.S. Appl. No. 12/436,869 mailed on Mar. 14, 2014.
Notice of Allowance in U.S. Appl. No. 12/436,912 mailed on Jul. 18, 2013.
U.S. Appl. No. 14/088,387, filed Nov. 23, 2013 and entitled System and Method for Providing Sequenced Anonymous Communication Sessions Over a Network, Inventor Michael G. Bustamente.
Rosenberg et al., "SIP: Session Initiation Protocol", Network Working Group Request for Comments: 3261, Jun. 2002 (202 pages).
Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).
Zoosk Customer Support, "How Do I Video Chat?" available online at <URL https://zoosk.zendesk.com/entries/20513017-how-do-i-video-chat> Oct. 7, 2011 (3 pages).
Fiore, Andrew, et al., "Online Personals: An Overview," CHI 2004, Apr. 24-12, 2004, Vienna, Austria (pp. 1395-1398).
Non-Final Office Action in U.S. Appl. No. 12/415,839 mailed on Feb. 18, 2011.
Response to Non-Final Action dated Feb. 18, 2011 in U.S. Appl. No. 12/415,839, filed May 18, 2011.
Final Office Action in U.S. Appl. No. 12/415,839 mailed on Jun. 23, 2011.
Request for Continued Examination and Amendment in U.S. Appl. No. 12/415,839, filed Sep. 22, 2011.
Examiner Interview Summary in U.S. Appl. No. 12/415,839 mailed on Sep. 27, 2011.
Non-Final Office Action in U.S. Appl. No. 12/415,839 mailed on Oct. 13, 2011.
Response to Non-Final Action dated Oct. 13, 2011 in U.S. Appl. No. 12/415,839, filed Jan. 13, 2012.
Non-Final Office Action in U.S. Appl. No. 12/436,869 mailed on Feb. 7, 2012.
Response to Non-Final Office Action dated Feb. 7, 2012 in U.S. Appl. No. 12/436,896, filed Apr. 25, 2012.
Final Office Action in U.S. Appl. No. 12/436,869 mailed on May 30, 2012.
Request for Continued Examination and Amendment in U.S. Appl. No. 12/436,896, filed Jul. 25, 2012.

(56) References Cited

OTHER PUBLICATIONS

Non-Final Office Action in U.S. Appl. No. 12/436,912 mailed on Apr. 28, 2011.
Response to Non-Final Office Action dated Apr. 28, 2011 in U.S. Appl. No. 12/436,912, filed Jul. 28, 2011.
Final Office Action in U.S. Appl. No. 12/436,912 mailed on Oct. 11, 2011.
Request for Continued Examination and Amendment in U.S. Appl. No. 12/436,912, filed Dec. 8, 2011.
Non-Final Office Action in U.S. Appl. No. 12/436,912 mailed on Nov. 27, 2012.
Response to Non-Final Office Action dated Nov. 27, 2012 in U.S. Appl. No. 12/436,912, filed Feb. 27, 2013.
U.S. Appl. No. 13/869,912, filed Apr. 24, 2013 and entitled "System and Method for Providing Calendar and Speed Dating Features for Matching Users in a Network Environment", Inventor Michael G. Bustamente.
Notice of Allowance in U.S. Appl. No. 12/415,839, mailed on May 28, 2015.
Response to Non-Final Office Action dated Feb. 27, 2015 in U.S. Appl. No. 13/869,912, filed on May 27, 2015.

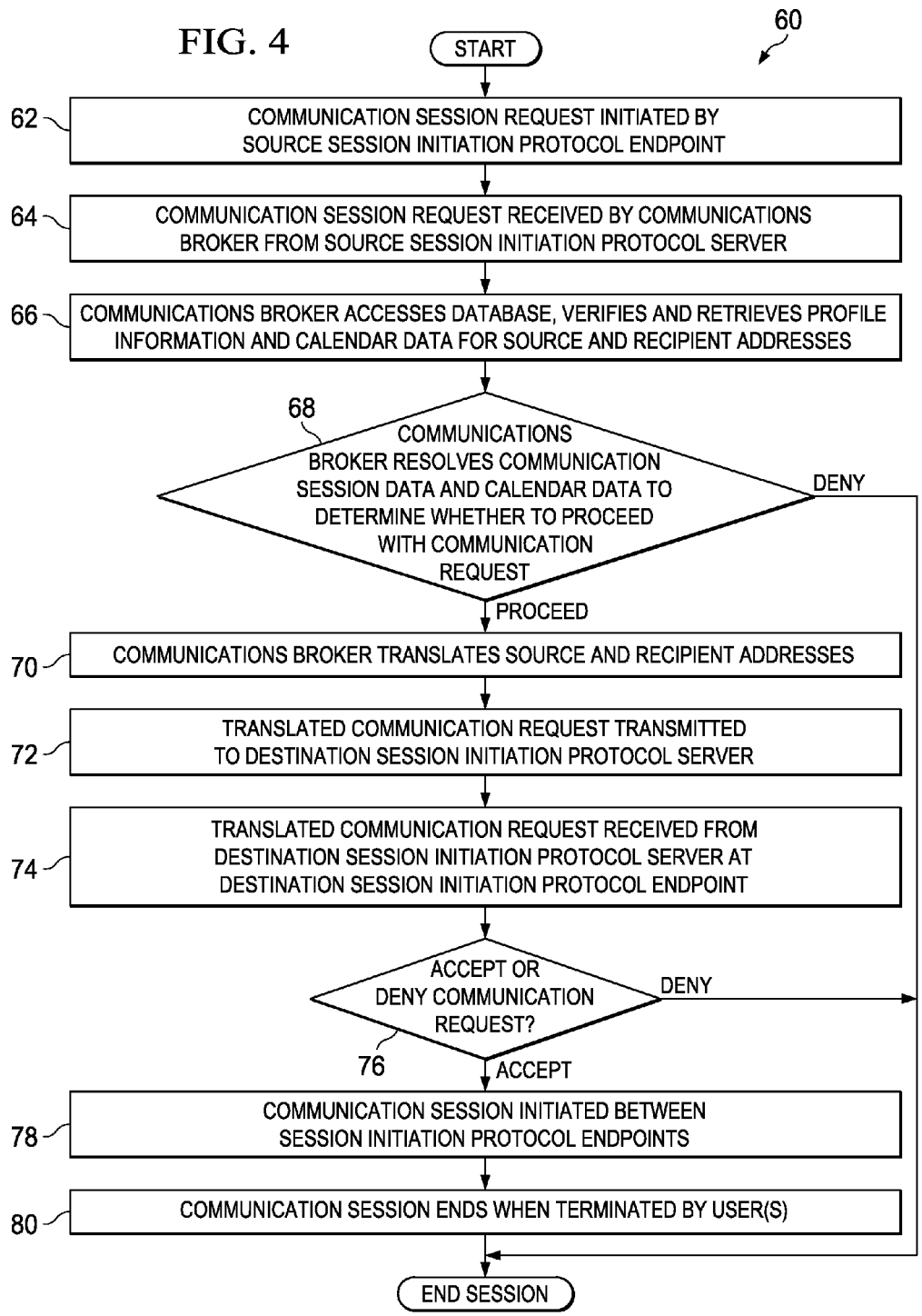

MY CALENDAR USER: JOE

| \multicolumn{7}{c}{MY AVAILABILITY SEPTEMBER 12} |
| Monday | Tuesday | Wednesday | Thursday | Friday | Saturday | Sunday |
|---|---|---|---|---|---|---|
| August 27 | 28 | 29 | 30 | 31 | September 1 | 2 |
|  |  |  |  |  | No available times entered | 15:00 - 18:00 Available for voice date <br><br> 20:00 - 20:30 Speed dating Event: Art Lovers |
| 3 | 4 | 5 | 6 | 7 | 8 | 9 |
| 19:00 - 23:00 Available for voice date | 18:00 - 19:00 Available for voice date <br><br> 20:00 - 21:00 Voice Date with SexySadie | No available times entered | 18:00 - 21:00 Available for voice date | 20:00 - 21:00 Voice Date with DearPrudence | 18:00 - 22:00 Available for voice date | 20:00 - 23:00 Available for voice date |
| 10 | 11 | 12 | 13 | 14 | 15 | 16 |
| 19:00 - 23:00 Available for voice date | No available times entered | 18:00 - 23:00 Available for voice date | 18:00 - 21:00 Available for voice date <br><br> 21:00 - 21:30 Speed Dating Event: Dallas 35-45 | No available times entered | 18:00 - 22:00 Available for voice date | 20:00 - 23:00 Available for voice date |
| 17 | 18 | 19 | 20 | 21 | 22 | 23 |
| No available times entered | 18:00 - 23:00 Available for voice date | 18:00 - 23:00 Available for voice date | No available times entered | No available times entered | 18:00 - 22:00 Available for voice date | 20:00 - 22:00 Available for voice date |
| 24 | 25 | 26 | 27 | 28 | 29 | 30 |
| 19:00 - 23:00 Available for voice date | 18:00 - 23:00 Available for voice date | No available times entered | 18:00 - 21:00 Available for voice date | No available times entered | 18:00 - 22:00 Available for voice date | 17:00 - 22:00 Available for voice date |

 CLICK TO ADD, CHANGE OR DELETE YOUR AVAILABILITY
— CALENDAR EDIT FUNCTION

FIG. 5

HTML AGGREGATE CALENDAR
(USER JOE WITH USER SALLY)

| Monday | Tuesday | Wednesday | Thursday | Friday | Saturday | Sunday |
|---|---|---|---|---|---|---|
| SCHEDULE A DATE WITH SALLY - SEPTEMBER 12 | | | | | | |
| August 27 | 28 | 29 | 30 | 31 | September 1 | 2 |
|  |  |  |  |  | No matching times | 20:00 - 21:00 Click to propose this time for voice date |
| 3 | 4 | 5 | 6 | 7 | 8 | 9 |
| 21:00 - 22:00 Click to propose this time for voice date | 18:00 - 19:00 Click to propose this time for voice date | No matching times | 19:00 - 20:00 Click to propose this time for voice date | No matching times | No matching times | 21:00 - 22:00 Click to propose this time for voice date |
| 10 | 11 | 12 | 13 | 14 | 15 | 16 |
| 22:00 - 23:00 Click to propose this time for voice date | No matching times | 18:00 - 19:00 Click to propose this time for voice date | No matching times | No matching times | No matching times | 20:00 - 21:00 Click to propose this time for voice date |
| 17 | 18 | 19 | 20 | 21 | 22 | 23 |
| No matching times | No matching times | 22:00 - 23:00 Click to propose this time for voice date | No matching times | No matching times | No matching times | 20:00 - 21:00 Click to propose this time for voice date |
| 24 | 25 | 26 | 27 | 28 | 29 | 30 |
| 21:00 - 22:00 Click to propose this time for voice date | No matching times | No matching times | 18:00 - 19:00 Click to propose this time for voice date | No matching times | No matching times | 17:00 - 18:00 Click to propose this time for voice date |

CLICKING AGGREGATE TIME OF MATCHING AVAILABILITY STARTS VOICE DATE SCHEDULING FUNCTION

VOICE DATE PROPOSAL FUNCTION

FIG. 6

SYSTEM AND METHOD FOR PROVIDING CALENDAR AND SPEED DATING FEATURES FOR MATCHING USERS IN A NETWORK ENVIRONMENT

CROSS-REFERENCE TO RELATED APPLICATIONS

This Application is a CONTINUATION-IN-PART of (and claims the benefit of priority under 35 U.S.C. §120) U.S. patent application Ser. No. 12/415,839, entitled SYSTEM AND METHOD FOR PROVIDING ANONYMITY IN A SESSION INITIATED PROTOCOL NETWORK, filed on Mar. 31, 2009, U.S. patent application Ser. No. 12/436,912, entitled SYSTEM AND METHOD FOR PROVIDING SEQUENCED ANONYMOUS COMMUNICATION SESSIONS OVER A NETWORK, filed on May 7, 2009, and U.S. patent application Ser. No. 12/436,869, entitled SYSTEM AND METHOD FOR PROVIDING ANONYMITY IN A VIDEO/MULTIMEDIA COMMUNICATIONS SESSION OVER A NETWORK, filed on May 7, 2009 all of which are hereby incorporated by reference herein in their entirety.

This Application also contains subject matter related to U.S. patent application Ser. No. 13/869,912, filed on Apr. 24, 2013, entitled "SYSTEM AND METHOD FOR PROVIDING CALENDAR AND SPEED DATING FEATURES FOR MATCHING USERS IN A NETWORK ENVIRONMENT", naming inventor Michael G. Bustamente, the disclosure of which is considered part of and is incorporated by reference in the disclosure of this application.

TECHNICAL FIELD

This disclosure relates in general to the field of communications and, more particularly, to a system and a method for providing calendar and speed dating features for matching users in a network environment.

BACKGROUND

Communications network architectures have experienced significant notoriety because they can offer the benefits of automation, convenience, and data management for their respective online communities. Certain network protocols may be used in order to allow an end user to be matched to other end users, or matched to scenarios in which they stand to benefit (e.g., job searches, person-finding services, real estate searches, online dating, etc.).

In the case of an online dating service, for example, an end user will typically be prompted to specify a variety of preferences to be used in matching the end user with other end users. In some cases, end users may desire to have their identity, address, or other personal information kept anonymous when interacting in an online environment. The ability to schedule, control, initiate, and facilitate communication sessions with a plurality of end users, while maintaining each user's respective anonymity, offers a significant challenge to network operators, administrators, service providers, and device manufacturers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified flow diagram illustrating an example methodology of one embodiment of the present disclosure;

FIG. 5 is a simplified diagram illustrating an example end user calendar in accordance with one embodiment of the present disclosure;

FIG. 6 is a simplified diagram illustrating another example end user calendar in accordance with one embodiment of the present disclosure.

DETAILED DESCRIPTION OF EXAMPLE EMBODIMENTS

Overview

Figure 1:
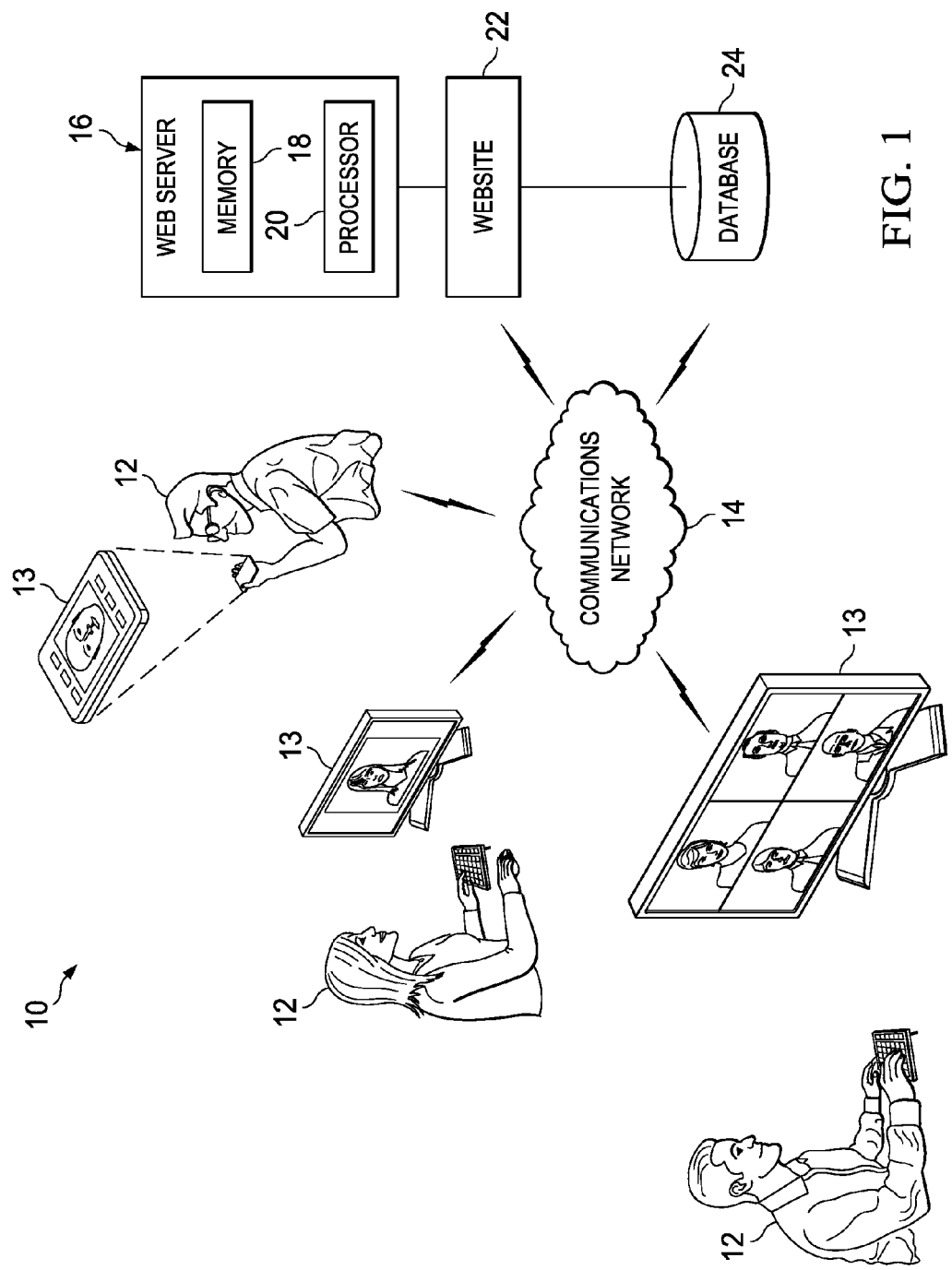
FIG. 1 is a simplified network diagram showing an example operating environment of a system for providing calendar and speed dating features in accordance with one embodiment of the present disclosure.

A method is provided in one example embodiment and includes receiving a request at a communication broker for a communication session to involve a first endpoint and a second endpoint. The method also includes evaluating (e.g., accessing, processing, identifying, etc.) first calendar information for a first end user associated with the first endpoint and second calendar information for a second end user associated with the second endpoint. The first calendar information is reflective of any type of date and/or time information relating to availability, openness, etc. for the first end user. The method also includes reconciling the first calendar information with the second calendar information to provide a time slot for the communication session. The term "reconciling" in such a context includes any activity associated with identifying potential overlap in the calendars, avoiding double booking and/or conflicts, identifying common availabilities etc. The method also includes mapping first end user data to a first identity associated with the first end user, wherein the second endpoint is shown the first identity, and where the first end user data associated with the first endpoint is hidden from being shown to the second endpoint. The term "mapping" in such a context includes any activity associated with translating two differing formats, correlating different identities, coordinating two different datasets, or otherwise processing information fostered the communication session.

In more particular embodiment, the first identity is associated with a user name assigned by a fee-based matching service (e.g., a profile name associated with a service provider). The user name is shown to a plurality of end users in an online community associated with the fee-based matching service. For example, the fee-based matching service can include being billed by the minute, by the communication session, the video session, through a monthly flat rate, or any combination of the above (which may or may not involve revenue sharing with $3^{rd}$ party providers).

The first end user data to be hidden can include an e-mail address associated with the first end user; a phone number associated with the first end user; an Internet protocol (IP) address associated with the first end user; an endpoint identifier associated with the first endpoint (e.g., indicating which type of device the endpoint is); a location associated with the first end user (e.g., an address, GPS tracking coordinates, Google Map data, etc.); a SIP address; an XMPP/Jabber address; an H.323 address; any unique voice or video IP identifier (e.g., used in conjunction with a user agent), etc.

In other embodiments, the method can include mapping second end user data to a second identity associated with the second end user, where the first endpoint is shown the second identity, and wherein the second end user data associated with the second endpoint is hidden from being shown to the first endpoint. Additionally, other implementations of the present disclosure can include rendering a single aggregated calendar to the first endpoint, where the aggregated calendar displays calendar availability data associated with the first end user and the second end user (e.g., concurrently).

The communication broker (which can be any suitable network element) can establish a first network connection (wired or wireless) associated with the first endpoint and a second network connection associated with second endpoint at the time slot. The actual communication session can be a video session; a voice call; a Skype call; a voice over Internet protocol (VoIP) call; a short messaging service (SMS) session; an email; or a texting session. In specific implementations, certain content input by the first end user onto a first calendar associated with the first end user is prohibited from being shown to other users belonging to an online community to which the first end user is a part. The request can be associated with a previous speed-dating event associated with an online community that subscribes to a fee-based matching service.

The time slot can be designated for a particular time interval that is correlated to a bandwidth characteristic for the communication session (e.g., conducting a high bandwidth communication session (associated with video) at non-working hours, where bandwidth would be more readily available). Business rules can be used in order to determine whether the communication session should be permitted between the first end user and the second end user. At least one of the business rules involves verifying whether the first end user and the second end user have paid a certain fee associated with a matching service. Additionally, at least one of the business rules can verify whether a block has been placed on either of the first end user or the second end user. The block can be associated with prohibiting certain communications (e.g., the first end user is prohibited from contacting the second end user, or more generally from contacting any user in the online community, or either user has designated that certain forms of communication are not permissible for them, etc.).

In yet other implementations, the communication broker can provide at least one piece of software to the first endpoint to facilitate the communication session. This could involve an application being downloaded by the first endpoint (e.g., an application to be provided to any type of smartphone (i.e., a Google Droid, an i-Phone, etc.), or tablet computer (i.e., an iPad, a Microsoft Surface, a Google Nexus, etc.), or a software download/update to facilitate certain video sessions, etc.

Example Embodiments

FIG. 1 is a simplified network diagram illustrating an example operating environment of a system 10 for providing calendar and speed dating features in accordance with one embodiment of the present disclosure. In a particular implementation, system 10 may be used for facilitating an online dating scenario in a network environment. In other matching scenarios, system 10 can be leveraged to identify and to evaluate suitable candidates in other areas (e.g., hiring/employment, recruiting, real estate, general person searches, etc.).

FIG. 1 includes multiple end users 12 and endpoints 13, a communications network 14, a web server 16 (comprising a memory 18 and a processor 20), a website 22, and a database 24. Database 24 may be any type of component for storing data, including but not limited to repositories, databases, memory devices, mass storage devices, data centers, etc. In system 10, users 12 can interact with web server 16 via endpoints 13, each of which can include an appropriate user interface for interacting with web server 16 to facilitate the functions and features described herein. In certain example implementations, website 22 and web server 16 are consolidated into a single component, physical structure, equipment, etc. Alternatively, these elements are separated as individual components that may share certain responsibilities, or that may be provisioned across several networks.

FIG. 1 may be configured such that inter and intra-communications are readily achieved by any of the components included therein. The present disclosure is capable of providing both an online component (as illustrated in FIG. 1) and an off-line component such that one or more end users can meet, gather information, conduct telephone calls, conduct video sessions, text each other, exchange any type of wireless communications, play games together, resolve to meet, meet in person, etc. Ancillary components to such a comprehensive process may involve pre-date profiles, post-date follow-ups, and a myriad of other features, some of which are outlined in detail below.

End users 12 may include various types of end users, such as clients, customers, prospective customers, entities wishing to participate in an online matching scenario and/or to view information associated with other participants in an online system. End users 12 may also seek to access end user profiles, or to initiate communications with other end users that may be delivered via communications network 14. End users 12 may review data (such as user profiles, for example) associated with other users in order to make matching decisions or selections. Data, as used herein in this document, refers to any type of numeric, voice, video, or script data, or any other suitable information in any appropriate format that may be communicated from one point to another.

End users 12 may access the aforementioned data via endpoints 13, which may be inclusive of devices used to initiate a communication, such as a computer, a personal digital assistant (PDA), a laptop or electronic notebook, a smartphone of any kind, a cellular telephone, an Internet Protocol (IP) telephone, an iPhone, an iPad, a Microsoft Surface, a Google Nexus, or any other device, component, element, or object capable of initiating voice, audio, or data exchanges within system 10. In a particular embodiment, endpoints 13 may download an application (from any suitable source, for example, iTunes, Google Droid Marketplace, etc.) that facilitates the online matching, speed dating, and/or calendar functions discussed herein.

Endpoints 13 may also be inclusive of a suitable interface to the end user 12, such as a microphone, a display, a speaker, or a keyboard or other terminal equipment. Endpoints 13 may also include any device that seeks to initiate a communication on behalf of another entity or element, such as a program, a database, or any other component, device, element, or object capable of initiating a voice or a data exchange within system 10. In addition, each of endpoints 13 may be a unique element designed specifically for communications involving system 10. Such an element may be fabricated or produced specifically for matching applications involving end user 12.

End user 12 may employ any device capable of operating as an endpoint to connect to communications network 14 via wire, wireless technology (e.g., WiFi, 802.11), cellular technology, satellite link, or other suitable frameworks. In a particular example, web server 16 can host website 22 and can be configured for transmitting and receiving any suitable information (e.g., user profile data, user and/or user endpoint data, user contact data, presence data, etc.). Presence data may be collected, aggregated, and utilized as appropriate to facilitate communications between endpoints 13 over communications network 14, or other outside communication systems. Presence data may also include information and/or instructions enabling the creation, duration, and termination of communication sessions between diverse endpoints 13 that utilize different communication and/or networking protocols.

Communications network 14 is a communicative platform operable to exchange data or information emanating from endpoints 13. In a particular embodiment, communications network 14 represents an Internet architecture that provides end users 12 with the ability to electronically execute or to initiate actions associated with finding a potential match with another user. Alternatively, communications network 14 could be a plain old telephone system (POTS), which end user 12 could use to perform the same operations or functions. Such transactions may be assisted by management associated with website 22 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a server that is operable to receive and to communicate information to end users 12. Alternatively, web server 16 may be any switch, router, gateway, processor, component, object, or element operable to facilitate communications involving end user 12. In one particular embodiment, web server 16 is configured to facilitate interaction(s) between parties interested in seeking a romantic partner (i.e., online dating). For example, website 22 can be online dating service provider www.Match.com, www.Chemistry.com, or any other suitable service provider. In certain example scenarios, a given end user may pay a fee for a subscription-based service. Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store and/or present a larger volume of data to other users (e.g., videos in the profile), the ability to share data, the ability to upload additional information, the ability to target specific searches based on particular criteria, the ability to receive preferential positioning in the context of being matched to other users, the ability to participate in speed dating, the ability to participate in certain events sponsored by website 22, the ability to share calendar data with other users, the ability to perform video calls (e.g., Skype, etc.) with other users, the ability to perform audio calls with other users, etc.).

In other embodiments, website 22 is any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), eBay, Craigslist, Half.com, Amazon, etc.

Considerable flexibility is provided by the structure and arrangement of web server 16 and website 22 in the context of system 10. Thus, it can be easily appreciated that their functions could be shared, divided appropriately, or provided external to web server 16 or website 22. In such cases, the speed dating and/or calendar functions could be readily provided by a separate component, server, processor, device, or module. Note that these online dating features and capabilities may be provided in just one of the elements of FIG. 1, or distributed across several of them and/or others.

In operation of an example embodiment, consider a case where a given end user is interested in participating in an online dating scenario. End user 12 can access website 22 via communications network 14 using endpoint 13. Once the connection is established, the end user can register and create a profile on the site. Moreover, the end user can access website 22 through any suitable banner, pop-up, partnership, e-mail solicitations, direct mailings, etc. Along similar lines, any number of marketing tools may be employed in order to facilitate the speed dating activities and/or the calendar features discussed herein. For example, as an end user initially signs up for a membership, they could be provided with a free trial of online speed dating for a certain time period. Additionally, prolonged time on a particular site could be acknowledged by providing calendar functions and/or speed dating opportunities (e.g., gratis).

Once users are registered, matching of any form can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

It should be noted that any participant interactions discussed herein could take any suitable form. For example, the interactions can be facilitated by website 22 (e.g., through an e-mail platform, through a VoIP technology, through a session initiation protocol (SIP), through instant messaging, through any type of mobile communications (inclusive of texting), etc.). Additionally, interactions can be performed through any suitable third-party technology (e.g., interactions involving Facebook framework, a Twitter account, a Tumblr account, etc.). Some of these interactions can be facilitated by website 22 (e.g., provided as some sort of service as part of a subscription model), provided by an external third-party protocol, or provided in conjunction with some type of partnership involving website 22 and the external third-party protocol.

Website 22 can be configured to interface with endpoints 13 and database 24, and may also display data inputs from users via endpoints 13 and/or database 24. In one example, software that resides in web server 16 (which may also be provisioned at website 22) can be executed by processor 20 (potentially in conjunction with memory 18) to achieve the communication coordination, speed dating, and/or calendaring functions, while protecting end user anonymity as outlined herein. Such activity could also be developed externally and then uploaded to web server 16 (i.e., website 22). In one embodiment, web server 16 is configured as an "internet facing" server. Alternatively, web server 16 is configured to search hypertext transfer protocol (HTTP) traffic on a particular port (e.g., port 80, although any IP port including port 80 could be similarly utilized).

For purposes of teaching and discussion, it is useful to provide some overview as to the way in which the architectures disclosed herein could operate in various communication environments. The following information may be viewed as a basis from which the present disclosure may be properly explained. Such a discussion is for purposes of explanation only and, accordingly, should not be construed in any way to limit the broad scope of the disclosure disclosed herein and its potential applications.

Certain applications may require the creation and management of a communication session, where a session is considered to be any exchange of data between several participants. The implementation of these applications is complicated by the practices of participants: users move between endpoints, they may be addressable by multiple names, and they may communicate in several different media (in many cases simultaneously). Certain protocols, such a session initiation protocol (SIP), voice over IP (VoIP), real time messaging protocol (RTMP), and H.323, have been developed to carry various forms of real-time multimedia communication session data such as voice, video, text, and multimedia messages. Any of these protocols could readily be used in conjunction with the teachings of the present disclosure.

Focusing on one of these possible protocols for use with the present disclosure, SIP is an application layer, control protocol that is used to establish, modify, and terminate multimedia sessions, voice calls, video calls, etc. SIP can also invite participants to already existing sessions such as multicast conferences. Media can be added to (and removed from) an existing session. SIP transparently supports name mapping and redirection services, which supports personal mobility. End users can maintain a single externally visible identifier regardless of their network location.

SIP provides proxy-able messages used to perform call setup, modification, and termination functions. For example, one SIP message used to perform call setup functions is the INVITE message. The INVITE message is used to invite telephony devices to participate in media stream communications, such as voice communication, data communication, video communication, or any combination thereof. The INVITE message includes a session description protocol (SDP) portion that is used by end user devices to exchange media capabilities and other information. As unified networks emerge, it is becoming increasingly important to provide communication services seamlessly across SIP based packet networks to provide anonymous communications within these unified networks.

Certain SIP features can work in concert with various protocols to enable endpoints 13 (which may also be referred to as "user agents") to discover one another and, further, to agree on a characterization of a session they wish to share. For locating prospective session participants, and for other functions, SIP can enable the creation of an infrastructure of network hosts (which may also be referred to as "proxy servers") to which user agents can send registrations, invitations to sessions, and other requests. SIP is an agile, general-purpose tool for creating, modifying, and terminating sessions. SIP can work independently of underlying transport protocols and without dependency on the type of session that is being established.

SIP can support five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both the called and calling party locations; and 5) session management: including transfer and termination of sessions, modifying session parameters, and invoking services.

A standard SIP platform does not necessarily provide services. Rather, SIP provides primitives that can be used to implement different services. For example, SIP can locate a user and deliver opaque objects to his current location. If this primitive is used to deliver a session description written in SDP, for instance, the endpoints can agree on the parameters of a session. If the same primitive is used to deliver a photo of the caller as well as the session description, a "caller id" service can be easily implemented.

In some online social networks (Facebook, MySpace, Match.com, Twitter, Tumblr, etc.), end users desire that a user's identity, address, telephone number or other personal information remain anonymous so that other users on the network may not physically, electronically, or otherwise locate a user or utilize a user's contact information. Likewise, end users desire the ability to schedule communication sessions at periods convenient for them and to avoid communication sessions at inconvenient times or dates (e.g., calls after 11 PM or session requests at 2 AM). Thus, the ability to initiate a communication session (e.g., text messaging sessions, multimedia sessions, video sessions, voice call sessions, etc.) between two end users, without the exchange of personal contact information (and at periods convenient for each user in the context of a social networking network) is critical from various perspectives that can account for privacy issues, personal safety, identity theft/fraud prevention, personal convenience, enhanced user experiences, etc.

From the perspective of an administrator, the ability to enable communication sessions between end users based on various metrics enables efficient, safe and profitable administration of the network system. In an online social network for example, administrators may enable communication sessions between end users based on privileges granted to end users who subscribe to various membership levels offered by the online network, based on pay per session fee structures, based on pay per media models, or any other metrics applicable to operation of the network.

Figure 2:
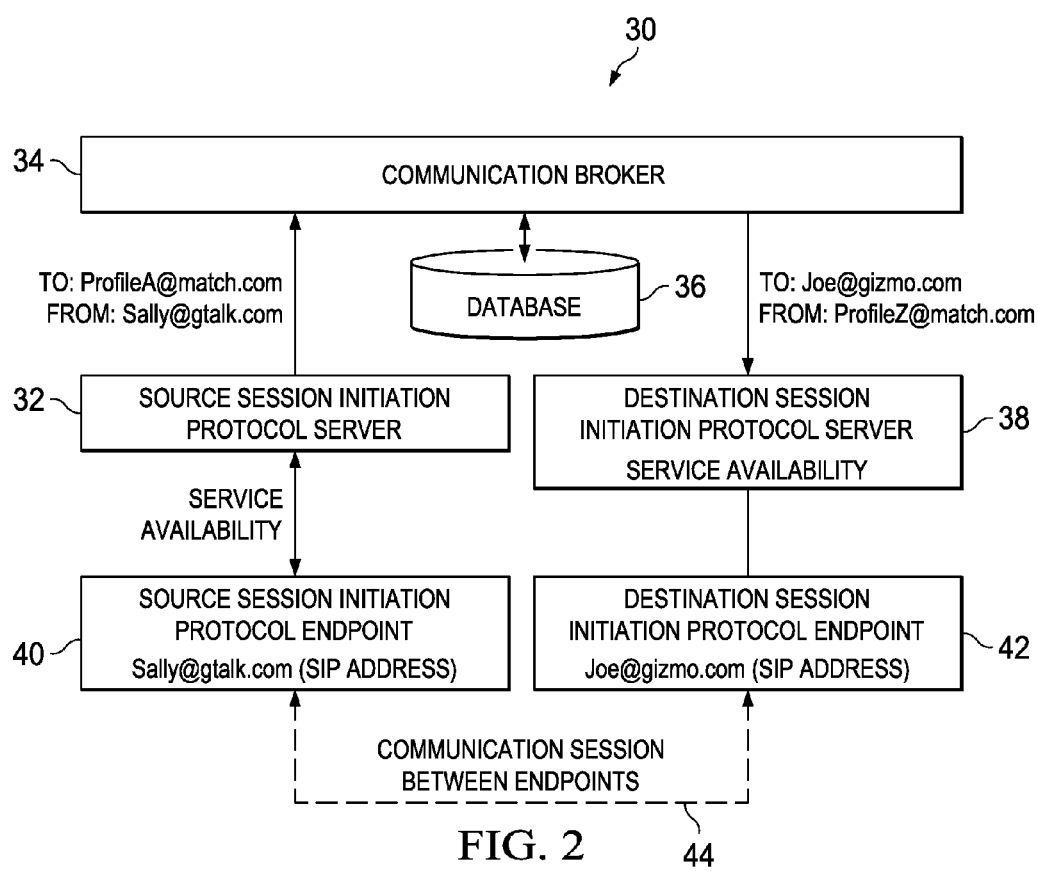
FIG. 2 is a simplified diagram illustrating an example portion of a network for providing anonymous communications in an online network environment in accordance with one embodiment of the present disclosure.

FIG. 2 depicts the components of a communications network 30 for providing user anonymity and for enabling communication sessions between end users. The network utilizes a source SIP server 32, a communication broker 34, a database 36, a destination SIP server 38, a source SIP endpoint 40, and a destination SIP endpoint 42. In an example flow, a first user desires to engage in a video session with a second user in any social networking scenario. Joe's personal contact information, which may include his internet protocol SIP address (e.g., Joe@gizmo.com), is not displayed publicly on the site, but a "profile name" is used [e.g., ProfileA@match.com]. Likewise, Sally's personal contact information, which may include her SIP address (sally@gtalk.com), is not displayed publicly on the site and her profile name is used (e.g., ProfileZ@match.com).

In one embodiment, the first user (e.g., Sally) seeks to have a voice date with a second user (e.g., Joe), whose personal profile she has reviewed on a social networking site, such as Match.com. Sally and Joe both indicate (e.g., to communication broker 34) that they are willing to participate in a voice date. This indication can be signaled through any appropriate means, mechanism, soft button, etc. (e.g., by selecting a phone icon being rendered by website 22). The indication can alert the system of each user's preferences and, further, trigger activities for communication broker 34 to access and reconcile each end user's calendar with the other. Communication broker 34 then performs operations such that Sally and Joe can view each other's profile calendars. This provides an opportunity for these users to indicate their respective availability for engaging in a voice date at a mutually convenient date and time.

In one embodiment, a view of a single aggregated calendar is displayed to both Sally and Joe: showing the mutually available dates and times for Sally and Joe to schedule a voice date (as was reconciled by communication broker 34). At the same time, neither of these users are permitted to see personalized information associated with specific calendar entries, as further detailed below.

By default, each user's time in the calendar can be shown as unavailable. When a user views his or her calendar, they are presented with options to define dates and times when they are available for a communication session in the calendar itself, which enables them to see upcoming events and details related thereto. The calendars of Joe and Sally are reconciled by communication broker 34 and configured to show the dates and times that are available for both Sally and Joe to engage in a communication session. This allows Sally to select a time to initiate a communication session with Joe, without the need for Sally to engage Joe directly to schedule a date and time for the communication session. Once a mutually acceptable time and date are shown to Sally and Joe via the calendar, either user may initiate a communication session by selecting a date and time from the calendar. For example, in this scenario, Sally can decide to be the initiator and select an available time and date. Communication broker 34 then sends a message (e.g., email, voicemail, text message, etc.) to Joe to confirm the communication session date.

To initiate the voice date process, the first user can use any suitable endpoint (e.g., a cell phone, a smartphone, a personal computer, etc.) to initiate a communication session with a second user, who similarly utilizes any suitable endpoint. If the technology being employed were SIP, then source SIP endpoint 40 sends a service availability request to source SIP server 32. SIP server 32 responds by initiating a session invitation to communication broker 34. In cases where SIP is not used, the mapping functions can be provided using any suitable technology that can achieve the same anonymity. This could involve certain tables that can be accessed to map one identity to another identity. This could also involve proprietary protocols that perform these activities. Network address translation (NAT) activities could also be used, where one identity is systematically being mapped to a second identity to protect the anonymity of the users (e.g., hiding their true e-mail address, etc.).

Communication broker 34 accesses database 36, which can include presence data, personal contact data, profile data, and/or calendar data for both the first and second users. The personal contact information and calendar information may include data that has been input by the end users (e.g., time and dates for communication sessions), or that may be internally input and regulated by the administrator, or data resulting from systematic polling of profile information, presence data, etc. For example, Joe may input data indicating that he only receives voice date calls between 7 PM and 10 PM on Fridays, while Sally may input calendar data indicating that she only participates in voice date calls between 6 PM and 9 PM on every other Friday of the month.

Communication broker 34 reconciles the communication calendar data and determines if Sally and Joe may participate in a voice date communication session at a specific date and time. In this example, communication broker 34 resolves that, as between Sally and Joe, a voice date session may be initiated between the hours of 7 PM and 9 PM on Friday. Database 36 and/or communication broker 34 may then offer the destination contact information for the call set-up process performed by communication broker 34. Additional information may also be provided by the end user and/or the administrator related to the calendaring of communication sessions based on various metrics, including but not limited to, date, time, duration of the communication session, topics for discussion, call back or ring back preferences, type of communication session, network membership/access privileges, or any combination thereof. For example, administrators may provide date and time limitations related to end user membership privileges or pay-to-communicate protocols (e.g., $XX.XX per call at certain dates and times, per unit of time, or per type of communication session (e.g., voice, video, etc.)). Such calendar activities may also be formulated to take advantage of network bandwidth availability at various times of the day or night (e.g., video calls that consume higher bandwidth may be scheduled at non-working hours, whereas simple voice calls could be relegated to daylight times).

Hence, one aspect of the present disclosure involves an intelligent communication broker 34 that can retain control over real-time communications. It can effectively perform this function by playing "man-in-the-middle" to maintain user anonymity. The broker is agnostic to the communication (or Internet) protocols it is managing. Additionally, the calendar and speed dating features can apply to any real-time anonymous communication (e.g., voice, video, instant messaging, etc.). Communication broker 34 is configured for mapping identities that can be seen as proxies or tokens for the actual identities of end users. Communication broker 34 can retrieve correlating information (between mapped identities and real identities) and this can be used as the mechanism for maintaining anonymity. In one generic sense, these activities reflect a permission to have a conversation that is coordinated, orchestrated, and regulated through a central communication broker.

Consider another example involving Match.com's double-blind email systems. When a user navigates to a website (e.g., www.Match.com), views a profile associated with the user ID Dallas_Girl, and determines to contact her through e-mail, an e-mail can be sent to her through the Match system (to the e-mail address Dallas_Girl@match.com). Email servers can process the email and perform a database look-up to verify if the sending subscriber is allowed to send email, verify if Dallas_Girl is a paying subscriber, verify whether any blocks have been initiated by either of those subscribers (or by the system), etc.

Dallas_Girl is a mapped identity of her real email address suzy_wilson@comcast.net. The email servers take the original email, strip off the mapped header address information (for Dallas Girl@match.com, for example, at the TCP/IP level), and replace it with non-mapped information, suzy_wilson@comcast.net, to reach the true destination. In this sense, communication broker 34 is performing the man-in-the-middle paradigm, while protecting the true user identities. The email servers (or communication broker 34) can have specific business function-based code to control whether an action is allowed, while maintaining anonymity for subscribing customers. It would not be possible to simply email Dallas_Girl@match.com and retrieve a subscriber's real email address.

Hence, communication broker 34 can provide the anonymous voice and video equivalent of this double-blind paradigm. In operation, communication broker 34 can provide anonymous communication by using mapped identities and by transforming data packets in two directions for controlling subscriber communication. This could occur, for example, while complying with any existing and standard protocols. Such a scenario can enhance communications between users seeking to advance their relationships through some type of online service.

Consider an example that is illustrative of the heightened intimacy that can be achieved in the context of the present disclosure. A subscriber can spend an hour carefully crafting an extensive e-mail and project a persona different from who they truly are. This issue can be significant for online communities. If the interaction is moved to a voice call, this heightened intimacy adds value through certain real-time verbal communications (e.g., inflection, intonation, pauses, etc.), along with certain non-verbal cues, which would not otherwise be discerned through a benign e-mail. A voice call can allow an end user to converse with someone and gather clues about their education, intelligence, background, social skills, etc.: information that is difficult to gather over a random e-mail exchange.

In the case of video calls, the non-verbal context moves higher with mannerisms, physical appearance, body language, etc. This scenario can be extended to virtual dates for end users (e.g., in an on-line dating scenario). Each level of heightened communication can effectively reveal more information about the users. In a generic sense, there is a truthfulness or an authenticity factor being addressed by communication broker 34. Individual subscribers can project a persona that is in fact quite different from their true character. Business problems arise for online providers when mismatches and fraud occur. Hence, individuals that leverage communication broker 34 to conduct video calls or voice calls can quickly become more intimate, more familiar, or simply gather more information about their respective counterparty.

The same could be said of using communication broker 34 for job searches, as the architecture presented herein can be used to identify highly-qualified individuals before embarking on a formal interview process. A brief anonymous voice call or video conference could avoid wasting the time and expense in interviewing someone in person, who simply would never satisfy the job criteria.

Lastly, the concepts presented herein can be used to practice certain skills in educational environments, while potentially offering various levels of anonymity (e.g., speech classes in colleges and universities, speaking/presentation classes for professionals, systematically interviewing with prospective employers, etc.). The architecture provided herein can provide a safe place to further develop communication skills, while auguring toward a heightened skill level, an ideal relationship, a targeted job, etc. This could involve the use of certain profiles, which could include any suitable information about a given user.

In one particular implementation, a calendar system can be employed to provide boundaries about when it would be appropriate for both parties to have an anonymous conversation (e.g., a voice interaction). Additionally, it can be used it to extend business rules to communication broker 34. For example, the business rules can verify whether a particular user is at the correct subscription level for conducting certain types of communications (e.g., e-mail, texting, video, voice, etc.). Other business rules can verify whether any type of blocking is occurring between users (or by the system). In other instances, a certain amount of quota can be allotted to each of the users to use for their communication sessions. For example, a certain subscription level would entitle the user to two hours of voice calls per month, or one hour of video calls per month. In this sense, a metering activity can be performed by communication broker 34, as users conduct their communications and have their accounts debited accordingly (i.e., a fee-based structure for quota). In other scenarios, website 22 can be involved in some type of pre-approval process before users are formally connected through either a video call, a voice call, a text exchange, etc. In one particular example, an initial preapproval process occurs between users connecting a first time, whereas subsequent communications would not employ this preapproval protocol.

Communication broker 34 can maintain any suitable business rules to control the functions of the communications involving users. This is especially important for voice dating or video dating; otherwise, the phones, video cameras, video conferencing equipment, etc. could be initiated at unexpected (potentially unwanted) times (e.g., a phone ringing at 3 AM, video equipment being activated at various inopportune times, etc.).

In another example scenario, speed dating can be performed by communication broker 34. In one example scenario, communication broker 34 could be used to initiate the calls at predetermined times (e.g., mimicking an online speed dating service). In operation of one potential flow, a subscriber would not necessarily contact other subscribers for the speed dating. Instead, website 22 could run the speed dating operations/events, or communication broker 34 could perform these functions and call the endpoints individually.

In the case of speed dating, men and/or women can be rotated to meet each other over a series of short "dates" (e.g., usually lasting from 3 to 8 minutes depending on the particular event being offered by website 22). Anonymity can be protected during the initial speed dating event in order to reduce pressure to accept or reject a potential suitor. Additionally, anonymity can be provided in order for users to focus on the substance of each of the users (e.g., if the actual identities were revealed, simple Google searching could provide significant information to others participating in the online speed dating event).

At the end of each interval, communication broker 34 can send an alert (e.g., clinks a glass icon on the website, provides an audible sound, etc.) to signal the participants to move on to the next date. At the end of the event, participants can submit any suitable feedback about their experience (e.g., to the participants themselves, to website 22 in the form of a list of participants of interest to them, etc.). Alternatively, this information can simply be signaled through various icons of the user profiles for the subscribers. For example, a certain subscriber can simply 'like', 'wink', 'add to queue', etc. individuals they found interesting during the speed dating session. From the perspective of the counterparty, if there is a match, any subsequent operations can occur. For example, where a symbiotic match has occurred, contact information can be forwarded to both parties, invitations can be sent for a video call, invitations can be sent for a physical meeting, etc.

In certain cases, such speed dating events could require advanced registration, a heightened subscription payment, etc. Additionally, communication broker 34 may use its business rules in order to suitably balance the participants involved in the session. For example, certain fees may be waived for particular individuals to balance the gender ratio, to enhance compatibility chances, etc.

Figure 3A:
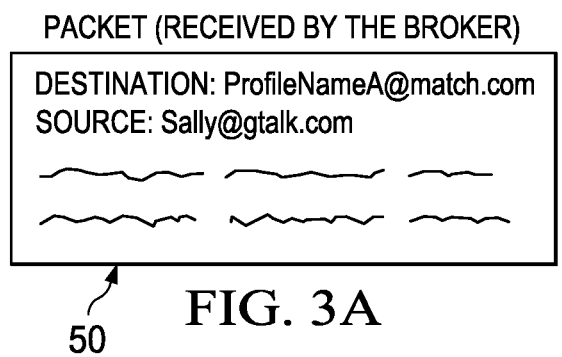
FIGS. 3A and 3B are simplified block diagrams illustrating a packet network address translation example in accordance with one embodiment of the present disclosure.
Figure 3B:
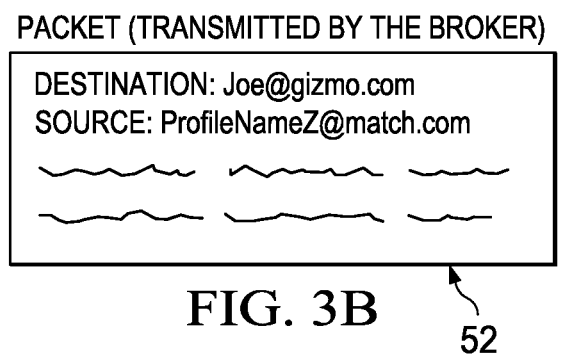

Turning to FIGS. 3A-3B, FIGS. 3A and 3B illustrate one example call set-up process (of many possible processes) that results in the removal of personal contact information exchanged between a first and a second user. This process enables the anonymous exchange of communications between users. FIG. 3A depicts a packet 50, which can be received by communication broker 34 from source SIP server 32. Packet 50 contains address information from a first user [(Sally) with a personal contact address (sally@gtalk.com)] that is requesting a call set-up with a second user (Joe), who has a profile contact address (profileA@match.com). As discussed above, communication broker 34 accesses database 36 and retrieves information for translating (i.e., a "mapping"), and thereby rendering anonymous, the profile name(s), profile contact address, and personal contact information of each user. Communication broker 34 prepares packet 52, as shown in FIG. 3B, with information showing the destination personal contact address of the second user (e.g., joe@gizmo.com) from a first user profile address (profilenameZ@match.com), in this example, Sally's profile contact address. By translating the personal contact information and profile names of the first and second users, communication broker 34 effectively prevents both the first and second users from transmitting or receiving any personal contact information during call initiation, call session, and call teardown.

Communication broker 34 next transmits a communication session call invitation message addressed to a second user (joe@gizmo.com) from a first user (profileZ@match.com) to destination SIP server 38. Destination SIP server 38 sends a service availability request to destination SIP endpoint 42 (e.g., Joe's cell phone, Smartphone, personal computer), which if available and accepted by Joe, initiates a communication session call set-up invitation back to Sally at SIP endpoint 40 (via communication broker 34). A communication session is then initiated between the users (e.g., Sally and Joe exchanging data at link 44) via their respective endpoints 40, 42, without the exchange of personal contact information. As a result, the end users may participate in audio dates, video dates, etc. at times that are convenient for both parties, while maintaining end user anonymity during the communication session.

FIG. 4 is a flow diagram 60 illustrating example operations associated with the present disclosure. As previously described, a first user or source initiates a communication session request from a SIP endpoint that is addressed to a second user or recipient (62) with a profile address. The communication session request is transmitted by a source SIP server and received by a communication broker (64). Communication broker 34 accesses a database to verify and to retrieve the profile information and calendar data for the first and second users associated with the source and recipient address information in the call request (66). Communication broker 34 reconciles the calendar data, and then displays an aggregate calendar to each end user showing dates and times that each end user is available for a communication session request (68).

If communication broker 34 determines that the communication session request does not fall within the acceptable reconciled communication session calendar, communication broker 34 denies the communication session request and the communication setup is terminated. If communication broker 34 determines that the communication request falls within an acceptable calendar boundary for the end user(s), communication broker 34 translates or "maps" the source and recipient addresses from the information retrieved from a database (e.g., automatically, at the instruction of the end user to do so (70), etc.). Communication broker 34 transmits the translated communication request to the recipient originating from the source profile address (72), with the translated call request being received by the recipient SIP endpoint from the recipient SIP server (74). The call recipient could then decide whether to accept or deny the communication request (76). If the recipient accepts the request, a communication session (e.g., telephone call, video session, etc.) is initiated between the SIP endpoints (78). The session can remain active until terminated by the user(s) (80). However, if the recipient denies the request for a communication session from the source, the session is terminated by communication broker 34.

FIG. 5 illustrates calendar information being displayed to an end user, as discussed herein. This particular example involves Joe, whereas FIG. 6 illustrates both Sally's and Joe's calendar availability. Simple icons (soft buttons) can be used by a given user to add, change, or delete their respective availabilities. In one embodiment, once permissions are exchanged (and business rules satisfied), each user's calendar can be shown to the other interested user. One such rendering involves superimposing (aggregating) one user's calendar onto another user's calendar. This could involve certain color schemes to better highlight information (e.g., blue calendar availabilities for men, pink calendar availabilities for women, colors selected by end users, etc.). In a particular example, the ability to view the calendar is part of a larger progression of interactions involving Joe and Sally. For example, this relationship could have originated with a simple wink message propagating through website 22, from a speed dating session, from a match being provided in one of the parties to queues (on their profile), from searching activities initiated by one of the users, etc.

Once the business rules have been satisfied, User 1 can see their own personal calendar with its various scheduled appointments or "dates", while viewing another user's calendar (User 2's calendar). In this example, Joe is capable of viewing dates and times that User 2 is available to participate in a communication session with him. In certain example embodiments, Joe (User 1) is not allowed to view the complete contents of User 2's calendar, only the potential timeslots available for communicating, for potential dating, etc. This helps to maintain privacy for each of the users.

FIG. 6 illustrates an aggregate calendar being displayed for a particular user. The aggregate calendar provides end users with a calendar that shows mutually available dates and times for a communication session between several end users. Communication broker 34 reconciles the calendars of multiple users and, further, renders an aggregate calendar for the end users, where the aggregate calendar shows those dates and times that each user would be available for some type of communication session (e.g., a video call, a voice call, a texting exchange, etc.). This allows each participating end user to simultaneously view the available dates and times for communication sessions with specified end users.

Figure 7:
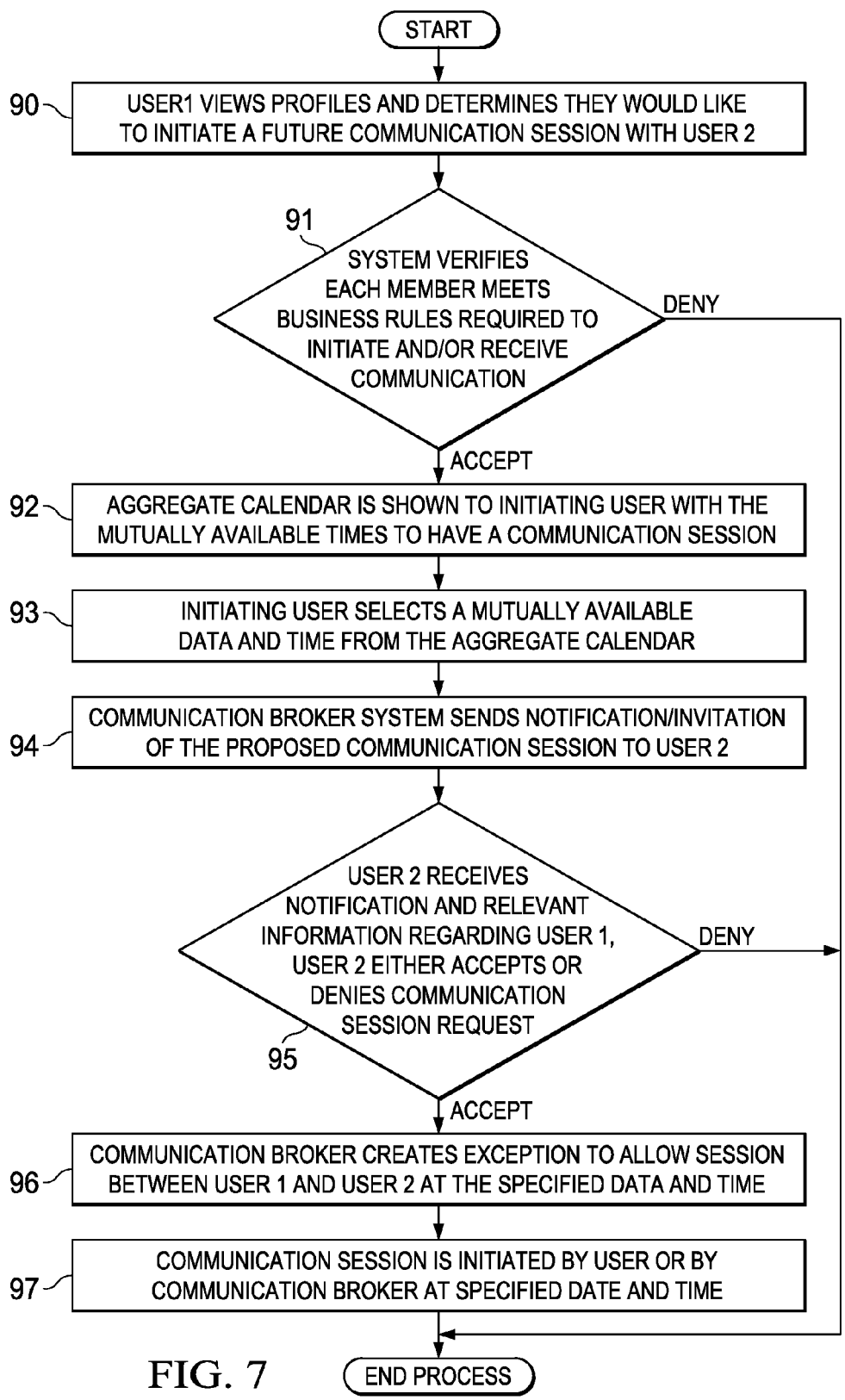
FIGS. 7-9 are simplified flow diagrams illustrating example methodologies for certain embodiments of the present disclosure.

FIG. 7 is a flow diagram illustrating an example operation associated with one embodiment of the online calendar feature disclosed herein. This particular feature may be provided in communication broker 34, or provisioned in any other suitable location. The flow may begin as User 1 decides to view the profile of User 2 and, subsequently, initiates a communication session (90). Each end user can be verified as a member of the online social network (91) (e.g., www.match.com, www.facebook.com, etc.). This verification may include membership status, subscription information, login credentials, and/or privileges (e.g., whether that user may engage in various types of communication sessions with other users, such as text, email, voice sessions, video sessions, etc.). Once verified, communication broker 34 analyzes the calendars of User 1 and User 2 and reconciles the dates and times User 1 and User 2 are available for a communication session. Various types of communication sessions could be reconciled and displayed for each user based on dates and times for different types of communication sessions.

The aggregate calendar can then be displayed to the initiating user (User 1) showing the dates and times that each are available for a particular type of communication session (92). User 1 selects a date and a time for a communication session with User 2 (93). Communication broker 34 sends a notification to User 2 for a communication session (94). Notifications could be provided via email, instant messaging, text messaging, phone calls, push notifications, alerts populated in a profile associated with a website, an AJAX update (or any other applicable communication protocol), etc. User 2 can receive the notification, potentially along with the associated relevant profile information for the initiating user (User 1), and may then either accept or deny the invitation (95). If User 2 declines the invitation, no communication session is scheduled between User 1 and User 2. If the invitation is accepted, communication broker 34 allows the communication session between User 1 and User 2 at the specified date and time (96). At the time of the mutually accepted communication session, either user could initiate the session, or the session could be provisioned by communication broker 34 (97), or the users could dial into a suitable communications platform.

Figure 8:
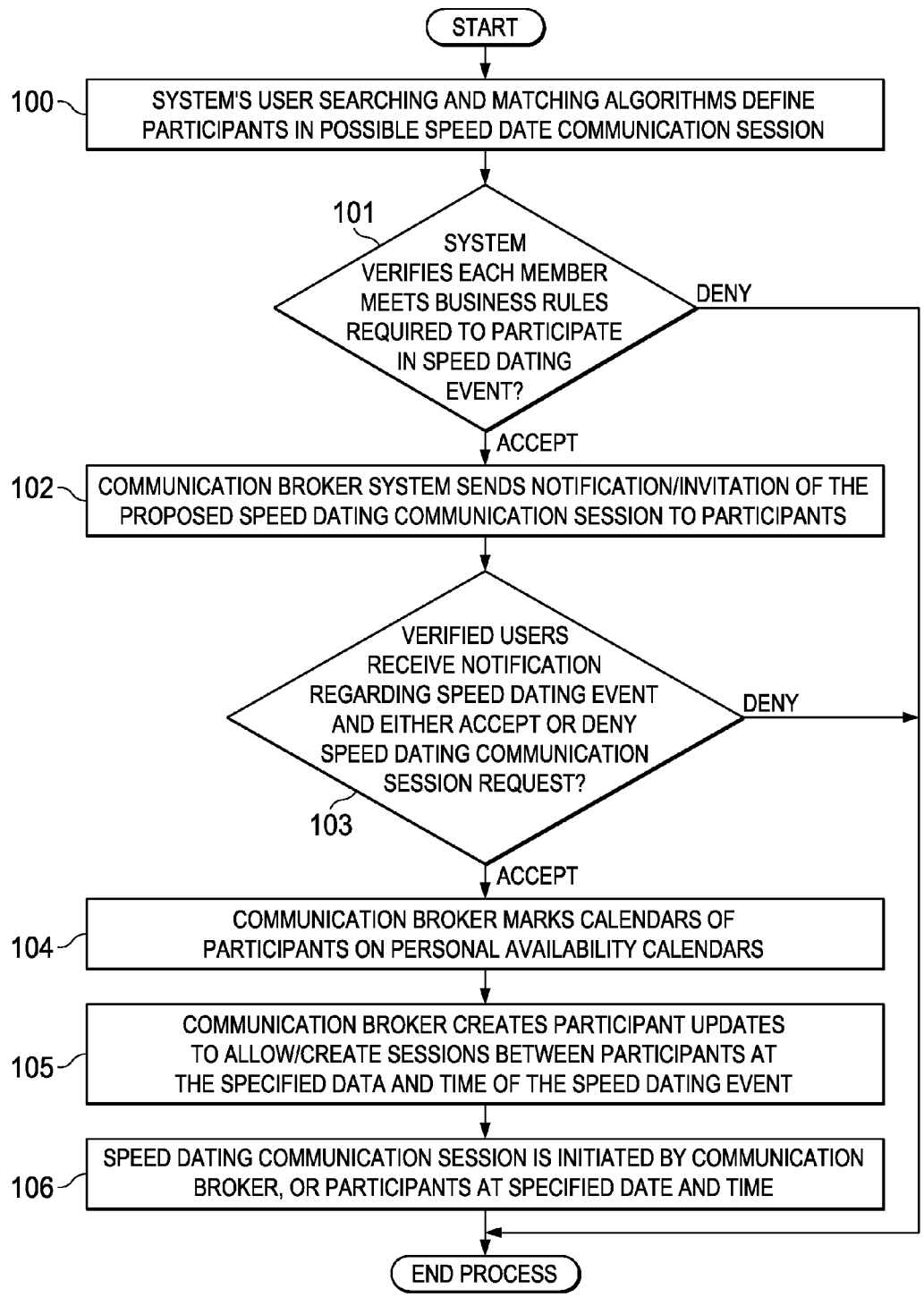

FIG. 8 is a flow diagram illustrating an example operation associated with the online speed dating activities disclosed herein. The system (e.g., communication broker 34) defines possible participants for attending an online speed dating communication session event (100). This screening of participants may include, but is not limited to, membership status, calendar availability, geographic location, personal interest, compatibility algorithms, and/or membership privilege levels for a particular service. Each end user can be verified as a member of the particular online social network (101). This verification may include membership status, calendar availability (e.g., avoiding double booking), membership privilege levels for the calendar service, or any other information discussed herein.

After identifying the applicable number of participants needed to facilitate an online speed dating communication session, communication broker 34 sends notifications to participate in the speed dating communication session event (e.g., to pre-verified participants (102)). Each pre-verified user receives notification and associated speed dating session information for the specified event, and they may then either accept or deny the invitation (103). Alternatively, website 22 can employ the use of advertisements, sign-up sheets, etc. in organizing such an event.

If a user declines the invitation, no communication session would be scheduled for that specific user. If the invitation is accepted, communication broker 34 can mark the calendar of the participant with the event (e.g., at the specified date and time) (104). Communication broker 34 can facilitate any system updates required to allow participants to attend the speed dating communication session (105). For example, certain audio software, video software, codecs, etc. can be installed, downloaded, or otherwise provisioned such that suitable communications can occur during the event. At the time of the speed dating communication session, users could initiate the session by dialing into a phone number, sending presence updates via SIP, XMPP, etc., or the session could also be initiated by communication broker 34 (106). Alternatively, communication broker 34 can organize an event through the use of presence data for SIP, XMPP, or similar presence services.

Figure 9:
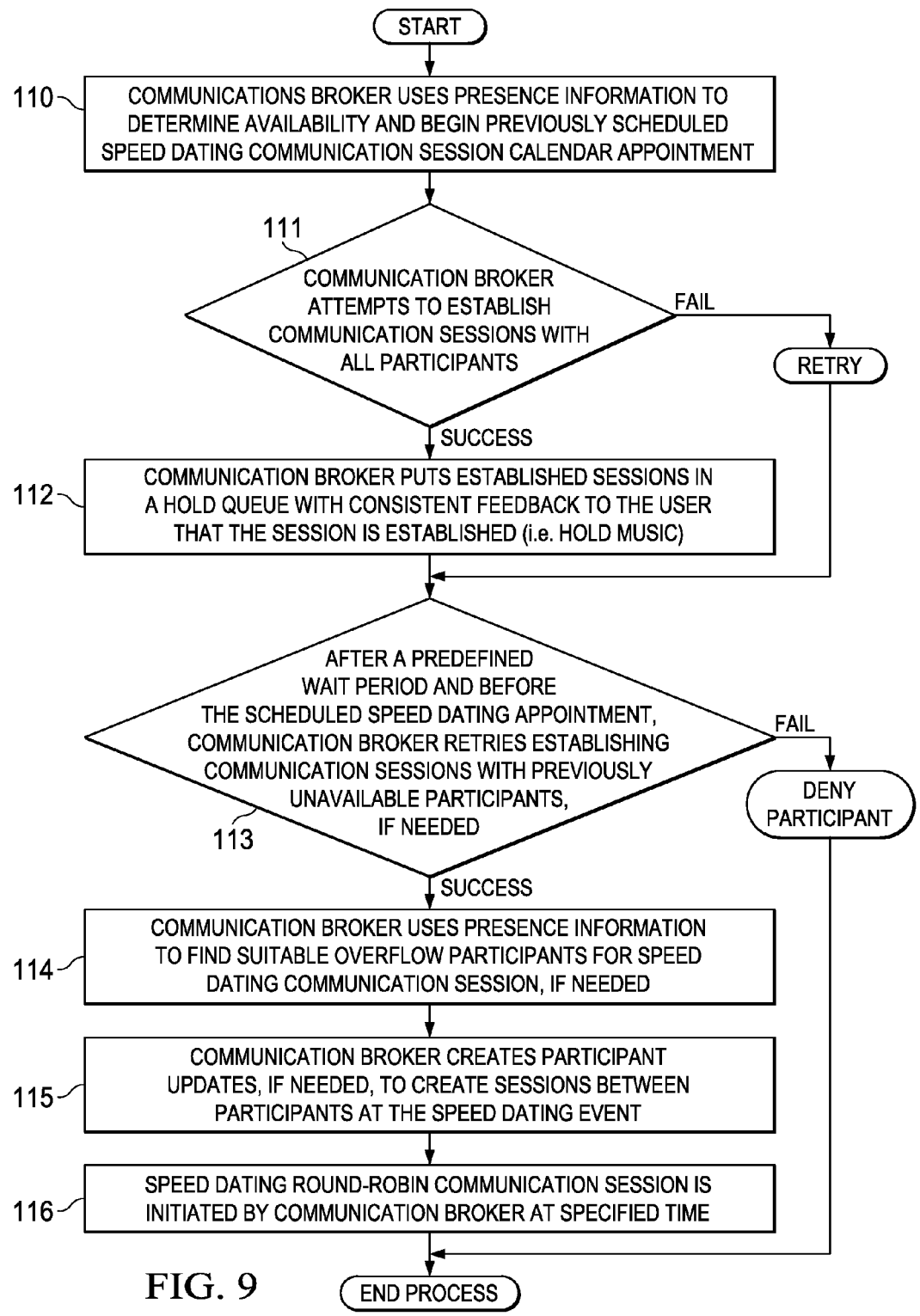

FIG. 9 is a flow diagram illustrating certain capabilities of communication broker 34, as applied to an online speed dating calendar event, as discussed herein. At any suitable predefined time interval before the start of the online speed dating event (e.g., 10 minutes), communication broker 34 can begin polling SIP/XMPP presence data to check the availability of each predefined participant's availability to start the event (110). After the polling is completed, communication broker 34 can begin establishing communication sessions with each participant (111). Participants that successfully establish sessions with communication broker 34 are placed into a queue with feedback that informs them they are approved for communication, and are waiting for the speed dating event to start (112). This queue with feedback could be considered equivalent to a hold recording, hold music, etc. In certain example scenarios, the user may also be provided with the opportunity to play various online games (e.g., an online game lounge) with other users.

Any unsuccessful session connections (or participants who did not respond to the initial presence data polling) can be placed into a retry queue. After some configurable wait period (e.g., 5 minutes), those previously failed participants are polled and communication sessions are retried. If the retry is successful, the participants are put in the hold queue as described above and, if still unavailable, they are denied entry to the event (113). A possible embodiment of the speed dating event can include defining an equal (or balanced/optimal) number of prospective participants (e.g., five men and five women, three employers and ten potential employees, etc.). In addition, the system could also define several overflow pool participants, who could be added to attend the online speed dating event as alternates (e.g., if the originally scheduled participants suddenly become unavailable for the communication session). These possible embodiments can involve an actual administrator interface (e.g., software, an administrative system, etc.) that has some type of authoritative presence in the model for designating rules, for balancing, or for changing the event in any appropriate way.

Communication broker 34 could poll presence data and begin establishing communication sessions for the alternates until an appropriate number of matching participants have been attained (114).

Once the event is filled with participants, communication broker 34 performs any appropriate updates for the participants (i.e., the endpoints) to facilitate the establishment of user-to-user session mappings for the speed dating event (115). User session mappings could be described as the collective one-on-one sessions for each participant to have a communication session with each of their prospective dating candidates. This can take place in a round-robin fashion (or using any other appropriate protocol), where each participant would communicate with each candidate for a predefined, structured communication period. Communication broker 34 can create, monitor, and destroy these one-on-one communication sessions, while maintaining at least one connection (e.g., a communication broker-to-participant session) to remain the facilitator of the event (116).

It is imperative to note that although the present disclosure has been described in detail with reference to particular embodiments, it should be understood that various other changes, substitutions, and alterations may be made hereto without departing from the spirit and scope of the present disclosure. For example, although the present disclosure has been described with reference to a SIP feature, it is critical to note that the present disclosure is not limited to such a SIP feature. Countless other protocols could be readily employed without departing from the teachings of the present disclosure. Moreover the usage of presence data reflects just one potential feature of the present disclosure. Such a feature could readily be removed, replaced, or otherwise substituted by other features. For example, simple software that pings or polls Microsoft Outlook data could easily be used in conjunction with determining the availability of end users (e.g., in the context of online speed dating, for calendaring activities, for matching more generally, etc.).

Note that in certain example implementations, the calendar and/or speed dating functions outlined herein, such as those carried out by communication broker 34, web server 16, website 22, and/or provided as an application for an endpoint being operated by an end user, may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory, as shown in FIG. 1, can store data used for the operations described herein. This includes the memory being able to store software, logic, code, or processor instructions that are executed to carry out the activities described in this Specification.

A processor can execute any type of instructions associated with the data to achieve the communication coordination, speed dating, and/or calendaring functions detailed herein in this Specification. In one example, the processor, as shown in FIG. 1, could transform an element or an article (e.g., data) from one state or thing to another state or thing. In another example, the communication coordination, speed dating, and/or calendaring activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Communication broker 34, web server 16, and/or website 22 illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

Additionally, although the current disclosure has been illustrated in certain environments (e.g., a SIP environment), it is not so limited to such environments. For example, the present disclosure could be applicable to any network protocol that can facilitate communications between two endpoints. This can include Skype technology, voice-over-IP (VoIP) technology, proprietary protocols developed for particular websites, platforms, etc., Telepresence protocols, WebEx protocols, multimedia protocols, or any other suitable protocol.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:

determining, using business rules, whether certain users qualify for a speed dating event, and wherein at least one of the business rules involves verifying whether a first end user and a second end user have paid a certain fee associated with a matching service;

evaluating first calendar information for the first end user associated with a first endpoint and second calendar information for the second end user associated with a second endpoint;

reconciling the first calendar information with the second calendar information to provide a time slot for the speed-dating event;

generating a notification for a speed dating event that is to involve at least the first endpoint, the second endpoint, and a communication broker, which includes a processor and a memory element, wherein the speed dating event includes interactions between the first end user associated with the first endpoint and the second end user associated with the second endpoint during at least one predefined time interval;

prompting the first endpoint and the second endpoint to join the speed-dating event prior to the speed-dating event starting;

mapping first end user data to a first identity associated with the first end user, wherein the second endpoint is shown the first identity, and wherein the first end user data associated with the first endpoint is hidden from being shown to the second endpoint during the speed-dating event; and mapping second end user data to a second identity associated with the second end user, wherein the first endpoint is shown the second identity, and wherein the second end user data associated with the second endpoint is hidden from being shown to the first endpoint during the speed-dating event.

2. The method of claim 1, further comprising:
evaluating compatibility characteristics associated with a plurality of end users in an online community; and
communicating the notification to only users meeting compatibility criteria associated with the speed-dating event.

3. The method of claim 1, wherein certain levels of anonymity are preserved for end users participating in the speed-dating event.

4. The method of claim 1, wherein matches that are identified during the speed-dating event are signaled back to particular end user profiles associated with the matches.

5. The method of claim 1, wherein an overflow pool is provided for the speed dating event such that end users in the overflow pool are added to the speed dating event by an administrator interface.

6. The method of claim 1, wherein the first identity is associated with a user name assigned by a fee-based matching service, and wherein the user name is shown to a plurality of end users in an online community associated with the fee-based matching service.

7. The method of claim 1, wherein the first end user data to be hidden includes a selected one of a group of elements, the group consisting of:
a) an e-mail address associated with the first end user;
b) a phone number associated with the first end user;
c) an Internet protocol (IP) address associated with the first end user;
d) an endpoint identifier associated with the first endpoint;
e) a location associated with the first end user;
f) a session initial protocol (SIP) address;
g) an XMPP/Jabber address; and
h) an H.323 address.

8. The method of claim 1, wherein the communication broker is to establish a first network connection associated with the first endpoint and a second network connection associated with second endpoint at a scheduled time slot.

9. The method of claim 1, wherein the first endpoint is a selected one of a group of endpoints, the group consisting of:
a) a personal computer;
b) a laptop computer;
c) a smartphone;
d) a personal digital assistant;
e) an Internet Protocol (IP) telephone; and
f) a tablet computer.

10. The method of claim 1, wherein the speed-dating event is associated with an online community that subscribes to a fee-based matching service.

11. The method of claim 1, wherein a session initiation protocol (SIP) is used in order to retrieve presence data associated with the first end user.

12. The method of claim 1, wherein the first endpoint and the second endpoint are permitted to exchange video data and audio data during the speed dating event.

13. The method of claim 1, wherein the communication broker provides at least one piece of software to the first endpoint to facilitate the speed-dating event.

14. The method of claim 1, wherein the first endpoint and the second endpoint rotate to interact with different end users at an expiration of the at least one predefined time interval.

15. A communication broker, comprising:
a processor and a memory element, wherein the communication broker is to perform operations comprising:
determining, using business rules, whether certain users qualify for a speed dating event, and wherein at least one of the business rules involves verifying whether a first end user and a second end user have paid a certain fee associated with a matching service;
evaluating first calendar information for the first end user associated with a first endpoint and second calendar information for the second end user associated with a second endpoint;
reconciling the first calendar information with the second calendar information to provide a time slot for the speed-dating event;
generating a notification for a speed dating event that is to involve at least the first endpoint, the second endpoint, and the communication broker, wherein the speed dating event includes interactions between the first end user associated with the first endpoint and the second end user associated with the second endpoint during at least one predefined time interval;
prompting the first endpoint and the second endpoint to join the speed-dating event prior to the speed-dating event starting;
mapping first end user data to a first identity associated with the first end user, wherein the second endpoint is shown the first identity, and wherein the first end user data associated with the first endpoint is hidden from being shown to the second endpoint during the speed-dating event; and
mapping second end user data to a second identity associated with the second end user, wherein the first endpoint is shown the second identity, and wherein the second end user data associated with the second endpoint is hidden from being shown to the first endpoint during the speed-dating event.

16. Logic encoded in one or more non-transitory tangible media that includes code for execution; wherein execution of the code by a processor performs operations comprising:
determining, using business rules, whether certain users qualify for a speed dating event, and wherein at least one of the business rules involves verifying whether a first end user and a second end user have paid a certain fee associated with a matching service;
evaluating first calendar information for the first end user associated with a first endpoint and second calendar information for the second end user associated with a second endpoint;
reconciling the first calendar information with the second calendar information to provide a time slot for the speed-dating event;

generating a notification for a speed dating event that is to involve at least the first endpoint, the second endpoint, and a communication broker, which includes a processor and a memory element, wherein the speed dating event includes interactions between the first end user associated with the first endpoint and the second end user associated with the second endpoint during at least one predefined time interval;

prompting the first endpoint and the second endpoint to loin the speed-dating event prior to the speed-dating event starting;

mapping first end user data to a first identity associated with the first end user, wherein the second endpoint is shown the first identity, and wherein the first end user data associated with the first endpoint is hidden from being shown to the second endpoint during the speed-dating event; and mapping second end user data to a second identity associated with the second end user, wherein the first endpoint is shown the second identity, and wherein the second end user data associated with the second endpoint is hidden from being shown to the first endpoint during the speed-dating event.

* * * * *